June 7, 1932. D. F. OLIVER 1,861,546
VEHICLE BODY
Original Filed April 19, 1926 4 Sheets-Sheet 1

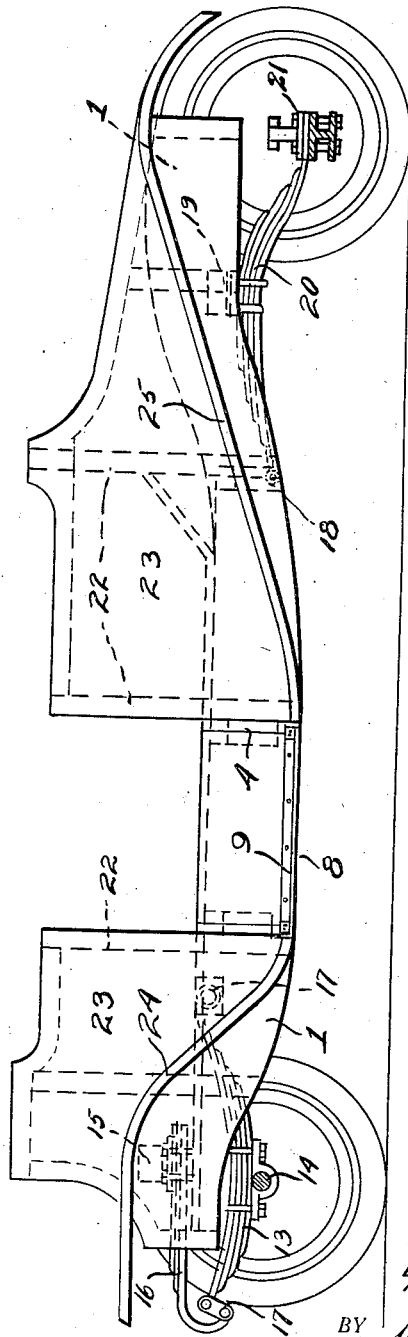

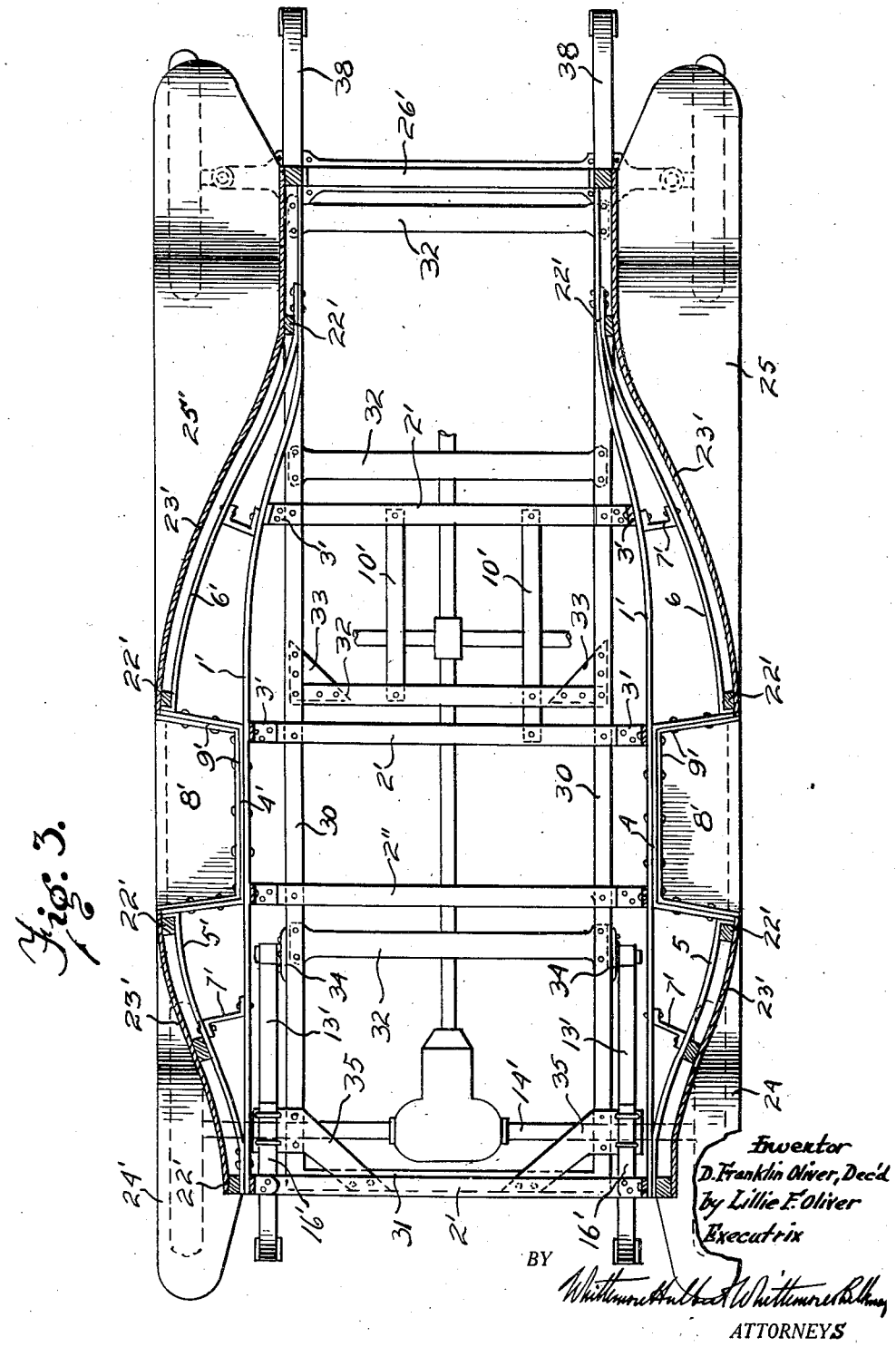

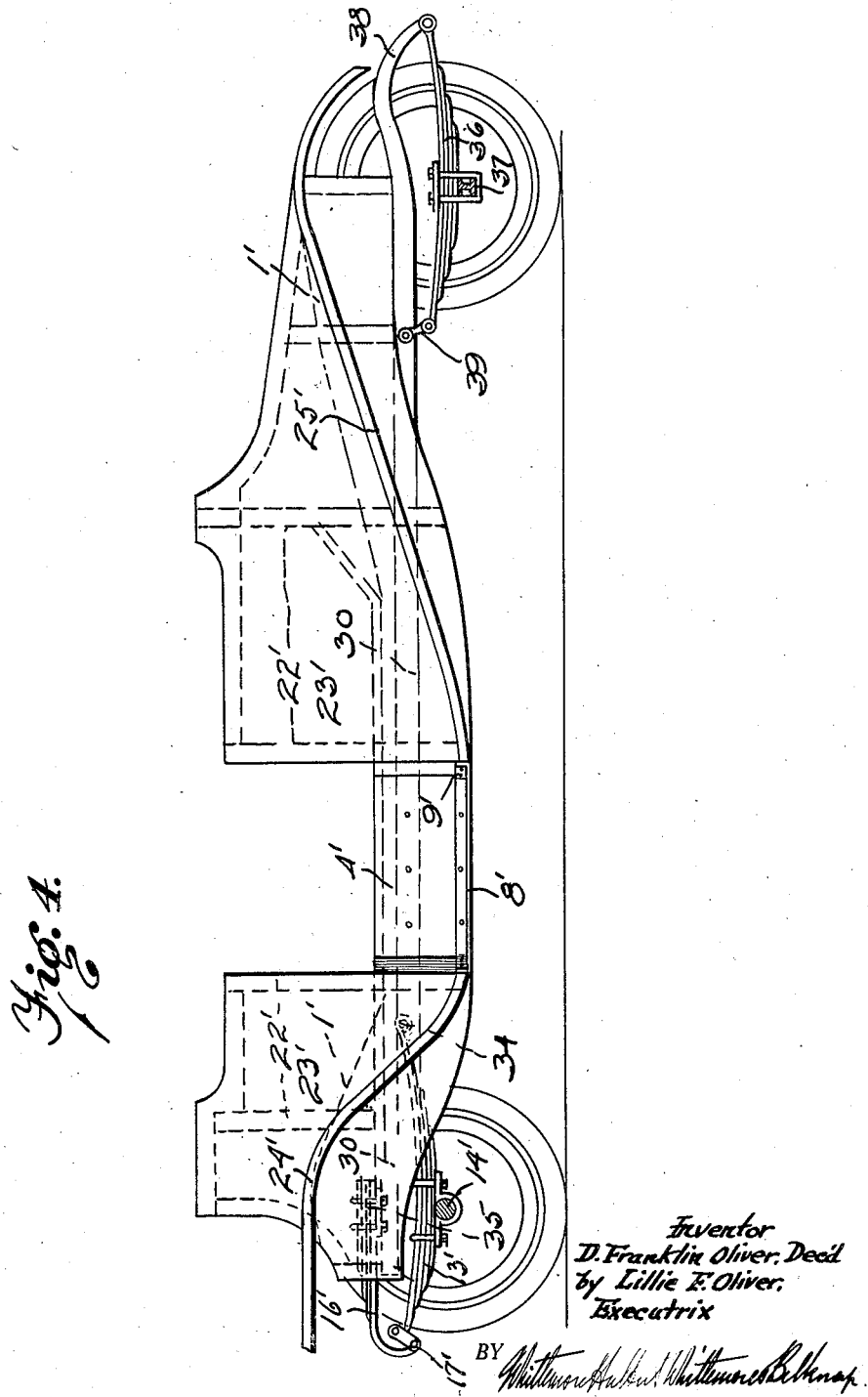

Patented June 7, 1932

1,861,546

UNITED STATES PATENT OFFICE

DOCTOR FRANKLIN OLIVER, DECEASED, LATE OF OAKLAND, CALIFORNIA, BY LILLIE F. OLIVER, EXECUTRIX, OF OAKLAND, CALIFORNIA

VEHICLE BODY

Application filed April 19, 1926, Serial No. 103,071. Renewed October 15, 1931.

This invention relates to certain new and useful improvements in vehicle bodies, and pertains more particularly to the body construction of motor vehicles.

The primary object of the invention is to provide a body which not only possesses maximum strength and rigidity, and minimum weight, but also one which can be used either with or without the usual chassis frame.

The invention also aims to provide a body structure which by elimination of the chassis frame enables lowering of the floor line and in addition economizes not only in saving of the cost of the chassis frame, but also in reduction of expense of producing the body structure.

A further object of the invention is to provide improved means for forming the door and step structure and to provide a body construction in which the fender possesses minimum area with consequent economy in cost of production.

In the drawings:

Figure 2 is a side elevation;

Figure 3 is a view similar to Figure 1 of a modified form of the invention; and

Figure 4 is a side elevation of Figure 3.

Figure 1:
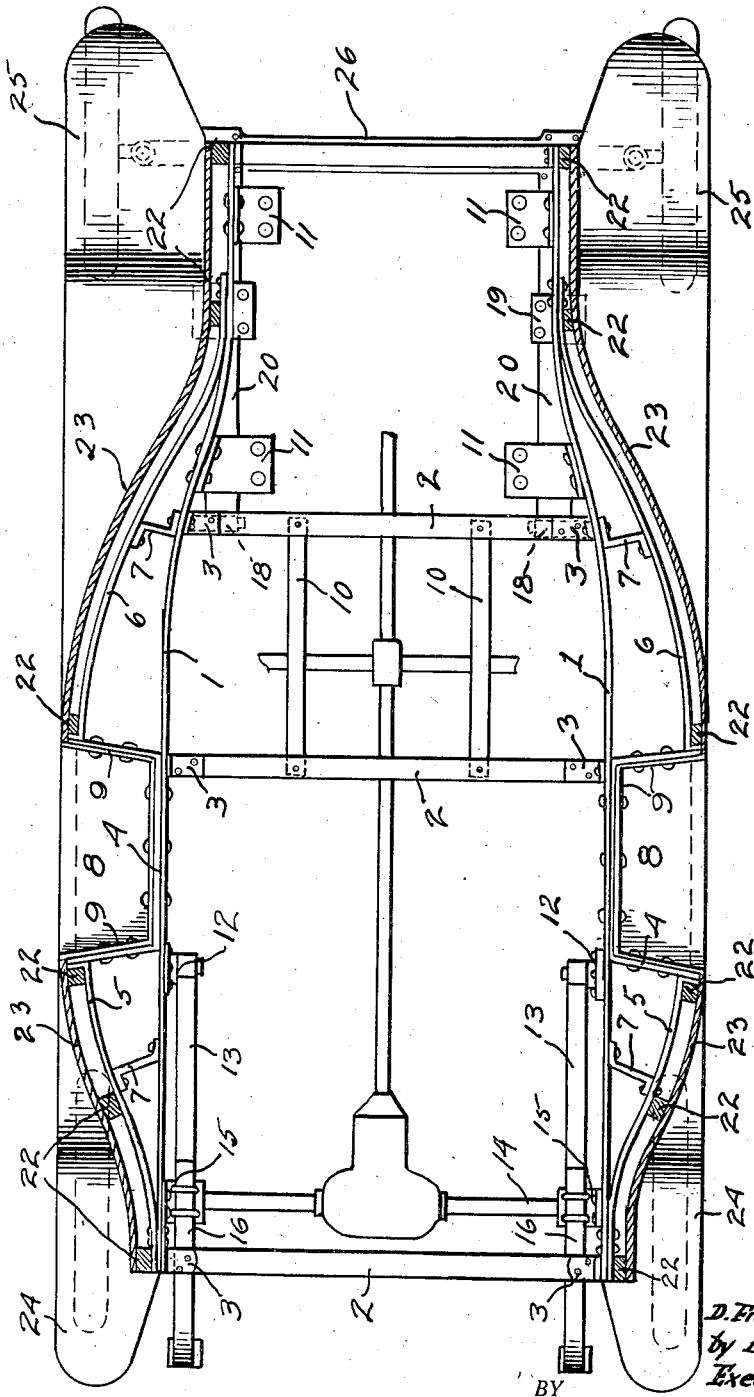
Figure 1 is a view partly in top plan and partly in section of the invention.

In proceeding in accordance with the present invention a pair of longitudinal inner side sills 1 of a length corresponding to the aggregate or total length which the body is to possess are employed. These sills are set vertically on edge and are connected to cross-bars 2 through the intermediary of brackets 3.

The side sills 1 bear door brackets 4 which latter are of approximately U-shape and have their bases riveted, bolted or otherwise appropriately secured to the outer side faces of the sills. The sides of the door brackets 4, at the outer or free ends thereof are rigidly affixed to the inner ends of a pair of outer side sills 5 and 6, the outer ends of which sills are rigidly connected to the free end portions of the inner side sills 1. The outer side sills 5 and 6 are curved to conform to the side contour which the body is to possess and are braced by transverse struts 7 interposed between and appropriately secured to the inner and outer sills. The outer side sills 5 and 6, may however, be omitted and the body sides be directly secured to the struts 7.

The door brackets 4 support the steps 8, which latter are provided with upturned marginal flanges 9 rigidly united to the sides and bases of the door brackets 4, as clearly depicted in Figure 1 of the drawings.

The cross-bars 2 may be suitably connected by braces 10, which with the cross-bars perform not only the function of bracing the body frame, but in addition means of support for mechanisms commonly associated with motor vehicles.

For the purpose of supporting the engine, brackets 11 are secured to the inner side sills 1 at their forward end portions and are adapted for connection with the feet of the engine.

The present invention is primarily intended to eliminate the presence of a chassis frame, and accordingly the front and rear trucks are directly attached to the body, for which purpose brackets 12 are secured to the inner side sills 1 and serve as means of support for the inner ends of lower springs 13, the latter being connected to the rear axle 14. Other brackets 15 are connected to the inner side sills 1 and are connected to upper half-springs 16, which latter have their rear ends suitably coupled to the rear ends of the lower springs 13 as indicated at 17.

The connection for the front truck to the body is effected by the provision of rear brackets 18 and front brackets 19 positioned forwardly of the body frame and secured in relatively spaced relation to the inner sills, the rear brackets 18 being connected to the rear ends of the front truck springs 20, while the front brackets 19 are connected to the springs 20 intermediate the lengths of springs 20, the front ends of the latter being secured to the front axle 21.

Uprights 22 are suitably connected to the sills aforementioned and provide means for attachment of the exterior finishing sides 23 of the body, and in addition serve to brace the sills transversely of their lengths.

It is particularly to be noted that the respective sills, cross-bars, uprights, brackets, and associated parts are related and combined so as to mutually contribute to provide a body construction of maximum strength and effectiveness in resisting strain, shocks and the like to which motor vehicles are invariably subjected, and in addition the important advantage of a frame possessed of extreme lightness and rigidity, without sacrificing strength, is gained.

Moreover, the present invention enables the fender structure to be directly attached to the finished body, and accordingly by reference to Figure 2, it will be apparent that the fender, which is composed of two parts 24 and 25 is secured to the finishing panels 23, in any approved manner, and due to the curved configuration possessed by the finished body sides, it will be apparent that fenders of minimum area are utilized, effecting economy in construction, and ones which also have their outer longitudinal side edges pursuing straight lines.

A radiator supporting bracket 26 is connected to the forward ends of the inner sills 1 and overlies the front axle.

The present invention is, however, susceptible of and contemplated also for use with a chassis frame, as depicted in Figures 3 and 4, wherein parts hereinafter referred to and designated by reference numerals with the addition of prime marks, correspond to the elements shown and described in the foregoing description and illustration of the form of the invention which dispenses with the chassis frame.

The chassis frame comprises longitudinal side bars 30 connected by a rear cross-bar 31 and intermediate cross and front bars 32, triangular corner reinforcing plates 33 being utilized to brace the central cross-bar 32.

The side bars 30 are provided with brackets 34 to which the front ends of the lower springs 13' are connected, while the front ends of the upper springs 16' are connected to corner brackets 35 connected to the chassis frame.

The attachment of the front springs 36 of the front axle 37 to the chassis frame is here effected by extending the forward ends 38 of the side bars 30 outwardly and curving same upwardly and downwardly and connecting the front ends of the springs to the ends 38 and by coupling their rear ends to the side bars 30 as indicated at 39.

The cross-bars 2' are bolted or otherwise secured to the side bars 30 and an additional cross-bar 2'' is employed to connect the body frame to the chassis frame.

In both forms of the invention the sills 1 and 1' are depressed at their central portions in order to impart graceful lines to the body and also to strengthen the sills.

What I claim as my invention is:

1. In a vehicle body, inner side sills, cross-bars connecting said sills, U-shaped door brackets having their bases connected to said sills and extending outwardly therefrom, and outer side sills connected at their inner ends to the free ends of the sides of the door brackets and having their outer ends secured to the adjacent ends of the inner sills.

2. In a vehicle body, inner side sills, cross-bars connecting said sills, U-shaped door brackets having their bases connected to said sills and extending outwardly therefrom, outer side sills connected at their inner ends to the free ends of the sides of the door brackets and having their outer ends secured to the adjacent ends of the inner sills, and step members arranged in said brackets and having outwardly extending marginal flanges secured to the brackets.

3. In a vehicle body, inner longitudinal sills set on edge and curved vertically and transversely of their lengths approximately at their centers, door brackets secured to said sills and extending outwardly therefrom, outer sills terminally connected to the door brackets and to the inner sills, and connections between the inner sills at the ends thereof.

4. In a vehicle, a body having curved longitudinal inner side sills, connecting means for the sills, step supporting door brackets borne by and projecting laterally outwardly from the sills, outer sills connected at their inner ends to opposite sides of the bracket and being curved inwardly and connected to the inner sills, uprights borne by the outer sills, finishing sides connected to the uprights, and fenders having cut-out parts which receive the curved sides whereby the outer longitudinal side edges of the fenders pursue straight lines and are substantially flush with the outer edges of said step supporting door brackets.

5. In a vehicle, a body having longitudinal sills, step supporting door brackets secured to said sills and extending outwardly therefrom, finishing sides secured to the door brackets at the free ends of the latter and being curved inwardly and secured to said sills, steps carried by said brackets between said finishing sides, and fenders having cut-out parts which receive the curved sides whereby the outer longitudinal side edges of the fenders pursue straight lines and are substantially flush with the outer edges of said door brackets.

6. In a vehicle body, longitudinal sills having intermediate depressed parts, step supporting door brackets secured to the sills at the sides of the depressed parts, finishing sides connected to the brackets and being curved inwardly and secured to the sills, and steps carried by said brackets between said finishing sides.

7. In a vehicle, a body having longitudinal inner side sills, door brackets carried by said sills and projecting outwardly therefrom, outer sills terminally connected to said door brackets and inner side sills, uprights carried by said outer sills, uprights carried by the inner sills at points beyond the ends of the outer sills and sides constituting portions of the exterior finish of the vehicle body connected to and carried by the uprights on both inner and outer sills.

8. In a vehicle body, the combination with longitudinal inner side sills, outwardly opening substantially U-shaped door brackets having their bases connected to said sills and projecting outwardly therefrom, outer side sills terminally connected to said door brackets and to said inner sills, uprights connected to said outer sills at opposite sides of said door brackets, uprights secured to the outer sills at the rear ends of said inner sills, uprights secured to said inner sills at the forward ends thereof, and finishing sides terminally connected to the uprights at opposite sides of said door brackets and to the uprights at the front and rear ends of said inner body sills.

9. In a vehicle body, inner side sills, connections between said sills, outer side sills, connections between said outer sills and said inner sills, and metal sheathing constituting a portion of the exterior finish of the vehicle body having intermediate portions secured to said outer sills and having end portions secured to the inner sills at points beyond the ends of said outer sills.

10. In a vehicle body, inner side sills, connections between said sills, substantially U-shaped door brackets having their bases connected to said sills and extending outwardly therefrom, outer sills secured to said inner sills upon opposite sides of said door brackets, and having portions extending outwardly and secured to opposite sides of said door brackets, and metal sheathing constituting a portion of the exterior finish of the vehicle body extending lengthwise of the vehicle body from opposite sides of said door brackets to the opposite ends of said inner sills, and connections between said sheathing and inner and outer sills.

11. In a vehicle body, inner and outer side sills, connections between said outer and inner sills, and a plurality of brackets secured to said inner sills and projecting outwardly between portions of said outer sills and constituting step supports, one of said brackets being secured to each of said inner sills.

12. In a vehicle body, inner side sills, door brackets of substantially U-configuration having the bases of the U's rigidly secured to said inner sills and having the sides of the U's projecting laterally outwardly from said side sills, and outer side sills having their forward and rear end portions secured to said inner side sills and having their adjacent portions secured to the side portions aforesaid of said U-shaped brackets at the outer edges thereof.

13. In a vehicle body, inner side sills, substantially U-shaped door brackets having the bases of the U's secured to said side sills and having the sides of the U's projecting laterally outwardly from said side sills, and finishing sides projecting forwardly and rearwardly from the laterally projecting sides of said brackets inwardly toward the forward and rear end portions respectively of said inner sills, and connections between said finishing sides and inner sills at the forward and rear ends of the latter.

14. In a vehicle body, longitudinal sills, step supporting door brackets secured to and projecting laterally from said sills, finishing sides having free end parts connected to opposite sides of the door brackets and to the sills, steps carried by said brackets between said finishing sides, and means between the sides and sills for connecting the sides between their ends of the sills.

In testimony whereof I affix my signature.

LILLIE F. OLIVER,
*Executrix of Doctor Franklin Oliver, Deceased.*